United States Patent [19]
Claes

[11] 3,762,849
[45] Oct. 2, 1973

[54] INJECTION MOULDING MACHINES, PARTICULARLY TO THE INJECTION HEAD THEREOF AND TO THE INJECTION MOULDS USED THEREWITH

[76] Inventor: Karel Claes, Kuringersteenweg 285, Hasselt, Belgium

[22] Filed: June 10, 1971

[21] Appl. No.: 151,806

[52] U.S. Cl.................... 425/190, 425/245, 425/54, 425/191
[51] Int. Cl................................................ B29f 1/02
[58] Field of Search.................... 425/190, 191, 192, 425/251, 245, 242, 178, 180; 249/54; 222/561, DIG. 7; 285/401

[56] References Cited
UNITED STATES PATENTS

| | | | |
|---|---|---|---|
| 3,195,185 | 7/1965 | Goffin et al.......................... | 425/190 |
| 1,575,688 | 3/1926 | Joanides.......................... | 425/180 X |
| 3,189,945 | 6/1965 | Strauss................................ | 425/245 |
| 2,927,543 | 3/1960 | Sherbody............................ | 425/190 |
| 3,076,225 | 2/1963 | Sherbondy...................... | 425/190 X |
| 2,948,018 | 8/1960 | Hintermann et al............ | 425/190 X |
| 220,871 | 10/1879 | Rutschman..................... | 285/401 X |
| 977,271 | 11/1910 | Callaghan..................... | 222/DIG. 7 |

FOREIGN PATENTS OR APPLICATIONS

740,386  11/1955  Great Britain...................... 425/190

*Primary Examiner*—J. Spencer Overholser
*Assistant Examiner*—David S. Safran
*Attorney*—Richards and Geier

[57] ABSTRACT

The invention pertains to improvements to injection moulding machines, according to which said machine is provided with an easily removable injection head designed to contain a supply of synthetic resin material sufficient to mould a series of objects within a mould provided with a closing device.

3 Claims, 19 Drawing Figures

INVENTOR.
BY Karel Claes

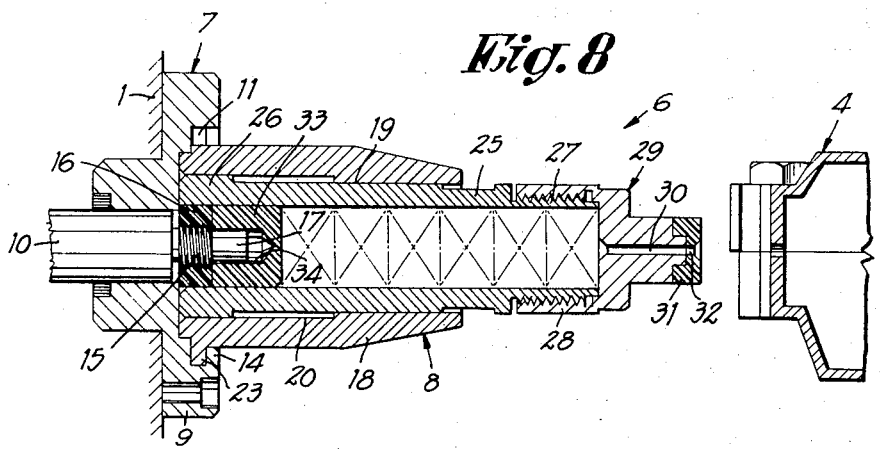
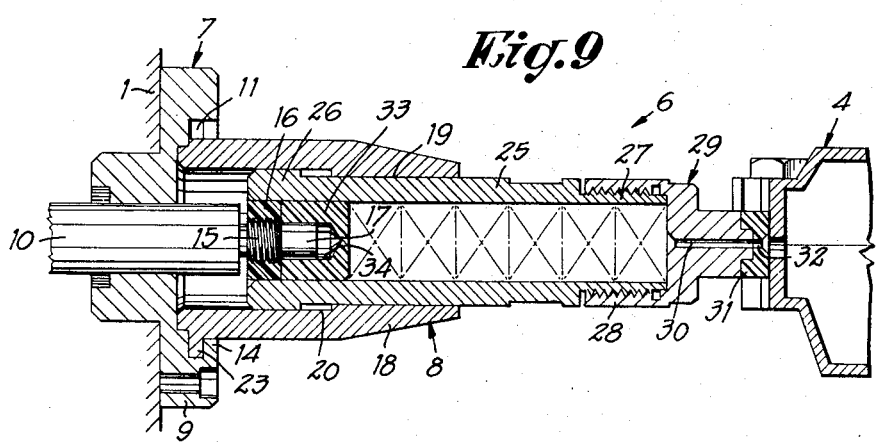
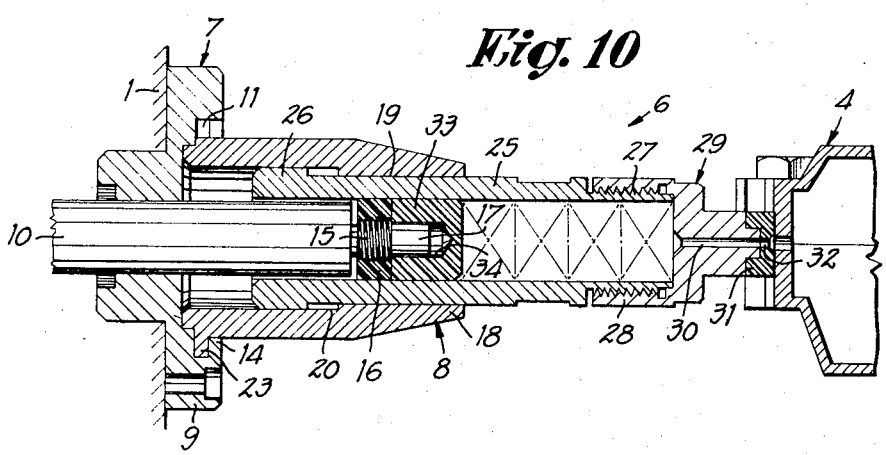

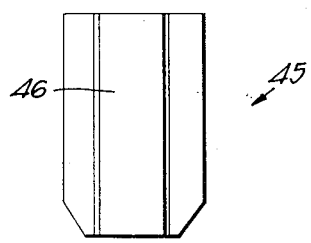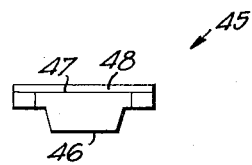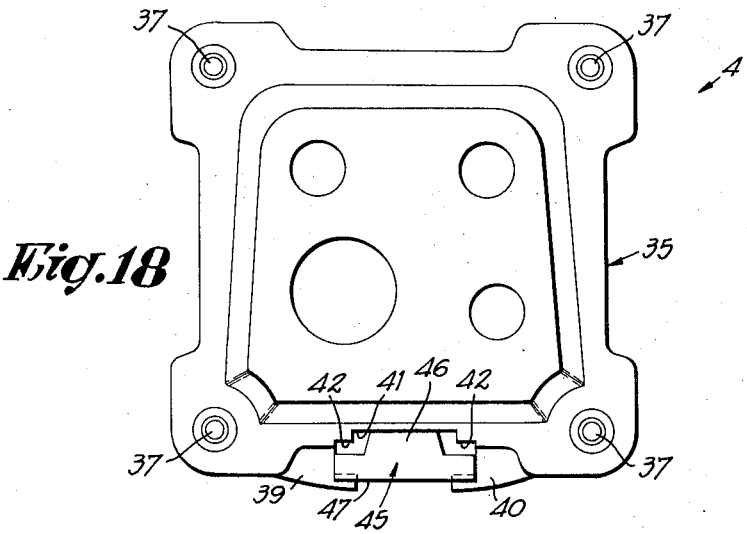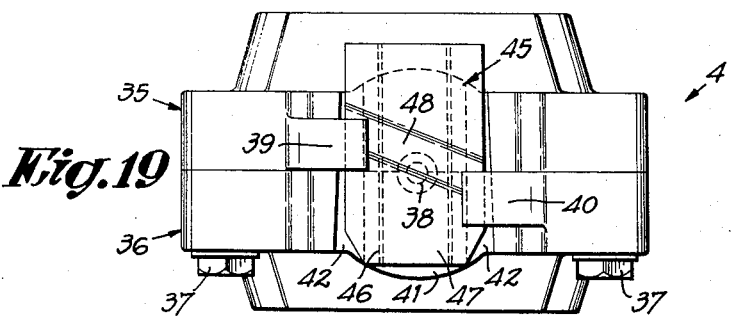

INJECTION MOULDING MACHINES, PARTICULARLY TO THE INJECTION HEAD THEREOF AND TO THE INJECTION MOULDS USED THEREWITH

The present invention relates to improvements to injection moulding machines, particularly to the injection head as well as the injection moulds used in conjunction with such machines.

More particularly the invention relates to injection moulding machines comprising moulds for the moulding of objects of synthetic resin material, such as dental prostheses.

A first object of the invention is to provide a design for said injection head which is specially adapted for very easy, fast and efficient mounting on, and dismounting from the body of the injection machine.

Another object of the invention is to provide an injection head, in which the filling cylinder is removable; capable of axial displacement; capable of being opened completely, and provided with a removable seal or packing, with a view to facilitating the removal and replacement of such cylinders and the expulsion of the plastic injection material therefrom, as well as permitting simple and easy cleaning of said filling cylinder.

Another object of the invention is to provide an injection head in which the formation of air bubbles in the plastic material it totally excluded.

The present invention aims at providing an injection head, in which plastic material may be introduced into the filling cylinder in the shortest possible time and in which empty filling cylinders may be replaced very rapidly by previously filled cylinders, so as to permit series production of moulded objects such as dental prostheses by repeated injection of plastic material, while the latter is in the deformable plastic condition, and in which said filling cylinder can be cleaned very efficiently.

Another object of the improvements according to the invention concerns said injection mould, more specifically the arrangement for sealing said injection mould.

This sealing or closing device is such that, as soon as the injection operation has been terminated, it permits the injection opening of the mould to be sealed immediately by a very simple operation, so as to effectively prevent reflux of the injection material and to maintain the pressure within the synthetic resin material throughout the polymerization thereof.

The arrangement permits very easy fitting and removal of the closing part without requiring special tools; adhesion of the synthetic resin material to the closing part is avoided and there will be no difficulties in removing said closing part nor damage to the dental prosthesis.

In order that the features and advantages of the present invention be more readily understood, a preferred embodiment will be described more in detail hereinafter, without limiting the scope of the invention, with reference to the appended drawings, in which:

FIGS. 8, 9 and 10 are views similar to FIG. 3, but showing the injection head according to the invention in different positions with respect to the injection mould.

FIG. 16 shows the same closing part as seen according to arrow F6 in FIG. 5;

FIG. 17 shows the same closing part as seen according to the arrow F7 in FIG. 6;

FIG. 18 is a view similar to FIG. 1, after insertion of the closing part in the appropriate place on the injection mould;

FIG. 19 is a view as seen according to the arrow F9 in FIG. 8.

Figure 1:
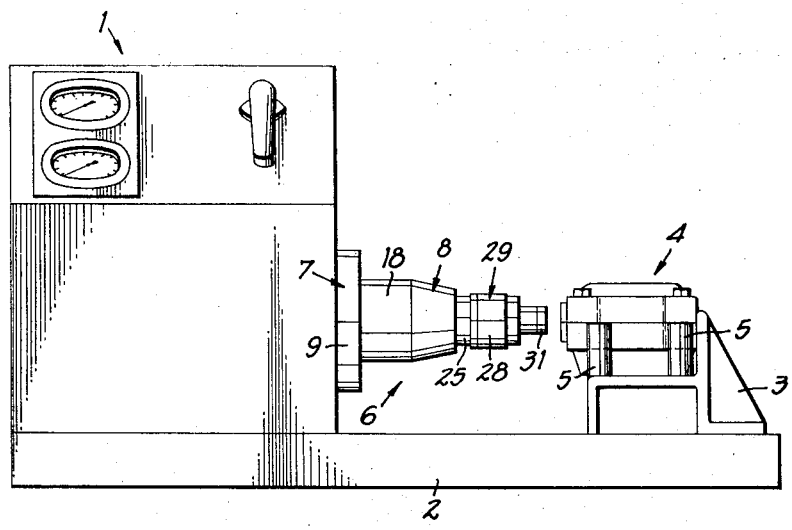
FIG. 1 is a schematical side-elevational view of a moulding press or injection apparatus provided with an injection head according to the invention.
Figure 2:
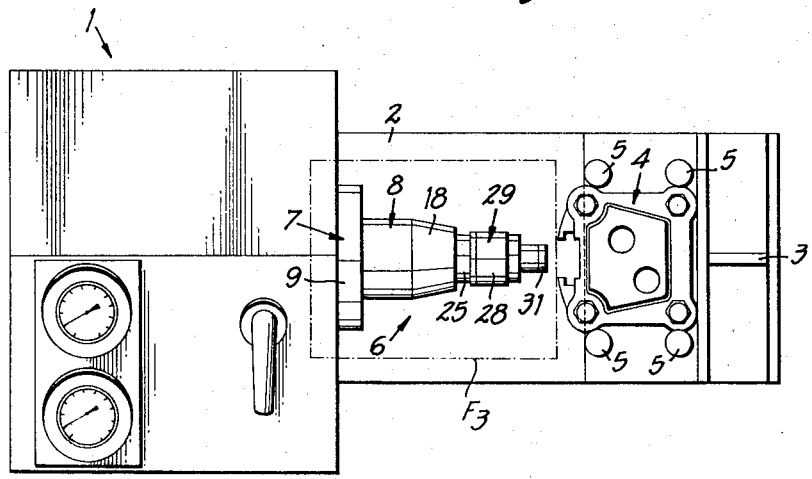
FIG. 2 shows a plan view of the apparatus shown in FIG. 1.
Figure 3:
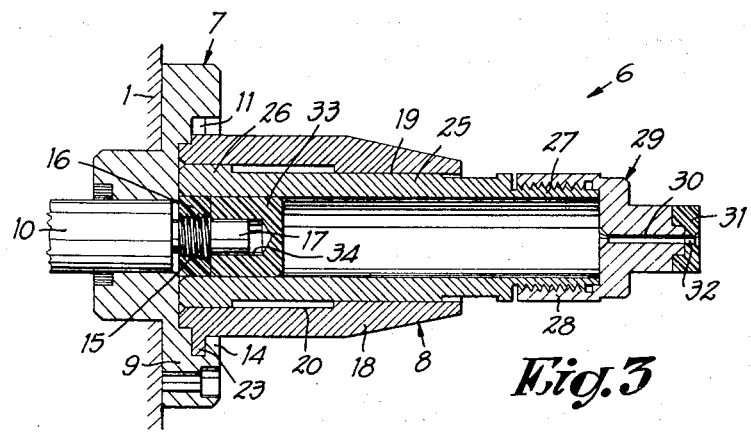
FIG. 3 shows, on an enlarged scale, the part indicated in FIG. 2 by F3 in lengthwise sectional view.

FIGS. 1 and 2 show a suitable press or injection machine 1, of a type known in itself, said machine being mounted on a table 2, which also carries an adequate support or pedestal 3 for carrying a mould 4, said support or pedestal being, e.g., provided with pins 5 suitably located for holding said mould and preventing it from tilting during the injection operation, and for keeping the injection opening thereof in alignment with the injection channel of the injection head.

On the aforesaid pressure apparatus 1 there is mounted an injection head 6 according to the invention.

Figure 4:
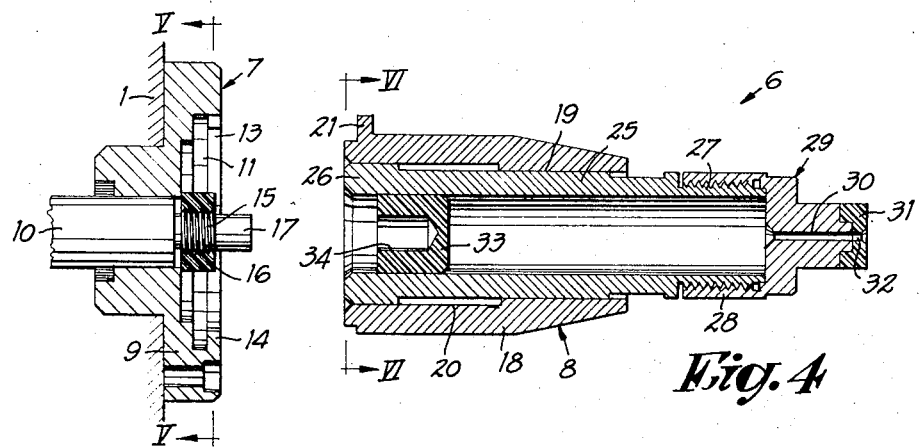
FIG. 4 is a view similar to FIG. 3, but showing the injection head removed from the press.
Figure 5:
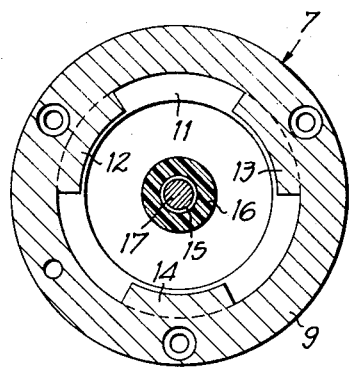
FIGS. 5 and 6 are sectional views taken along the lines V—V and VI—VI, respectively, in FIG. 4.
Figure 6:
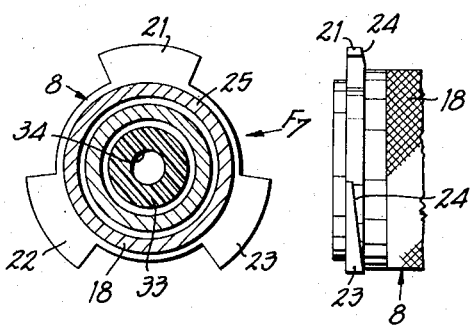

As shown in FIG. 4, this injection head 6 mainly comprises a part 7 that is fixed on said pressure apparatus 1, and a removable part 8.

The fixed part 7 in this case comprises a flange 9 fixed, e.g., by means of screws or bolts or the like on the outer face of said pressure apparatus 1, said flange being suitably shaped for guiding a rod or plunger 10 for the expulsion of the material contained in the injection head.

Said flange 9 has a circular inner groove or slot 11 provided therein, the outer rim of said groove having inward projecting parts or teeth 12-13-14 formed thereat.

The projecting end of said rod 10, as shown in the drawing, is provided with a threaded part 15 which cooperates with a cylindrical nut 16 made of a slightly compressible sealing material such as nylon or the like, said threaded part 15 being extended by a cylindrical part 17, the purpose of which will be explained hereafter.

The injection head proper 8 mainly comprises a coupling part 18, said coupling part being provided with an axial bore comprising two parts, viz., a first part 19 provided at the forward end of said coupling part 18, and a second part 20 provided at the backward end of said coupling part 18, said second part having a diameter slightly larger than the diameter of said first part 19.

Finally, at its backward end said coupling part 18 is provided with three outward projecting parts or teeth 21-22-23, the width of said teeth being slightly smaller than the distance between any two of the inward projecting teeth 12-13-14 of the aforementioned flange 9.

Figure 7:
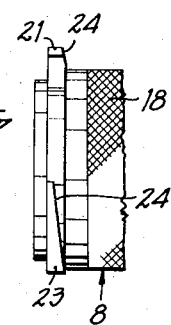
FIG. 7 is a view as seen according to the arrow $F_7$ in FIG. 6.

As appears from FIG. 7, said teeth 21-22-23 are each provided with a beveled edge 24 facing towards the forward end of the injection head.

By this arrangement it is obtained, that the fastening of said couping device 18 on the pressure apparatus, more specifically on the aforesaid flange 9, can be effected very easily and rapidly, simply by inserting said coupling part 18 in such a way, that said teeth 21—2-2—23 of said coupling part, after passing through the openings between the teeth 12-13-14 of said flange 9, are rotated so as to engage each behind one of said teeth 12-13-14 of said flange 9. Owing to the slope of said teeth 21-22-23, the rotation of said coupling part 18 will cause the latter to be firmly gripped and tightened in said flange so as to be securely held in coaxial alignment with respect thereto.

Obviously the same effect could be realized with straight teeth 21-22-23, provided the teeth 12-13-14 have beveled inner side walls.

Removal of such coupling part can simply be effected by rotating it in the inverse direction so as to disengage said teeth 21-22-23 from said teeth 12-13-14.

In said coupling part 18 a suitably shaped filling cylinder 25 can be inserted, said cylinder having an outer diameter approximately equal to the diameter of said axial bore 19 throughout the major part of its length. The backward end part 26 of said cylinder 25 has an outer diameter which is equal, or approximately equal to the diameter of the afroesaid bore 20 of the coupling part 18, whereas the forward end of said cylinder is provided with an external threading 27.

Screwed on said external threading 27, by means of an internally threaded part 28, a cover or cap 29 is provided, said cover or cap having a relatively small dimaeter central bore 30 provided therein, the forward extending part of said cover or cap having a disk-shaped sealing member 31, e.g., made of nylon, removably fixed thereon, said sealing member being provided with a central bore 32 held in alignment with said central bore 30 in said cover or cap 29.

Finally in the hindmost end of said cylinder 25 a plug 33 is inserted, said plug being provided with a blind axial bore 34, the diameter of which corresponds with the outer diameter of said extension 17 of said rod 10.

The use and the operation of the injection head according to the invention are very simple, as follows:

The moulds 4 to be filled by injection of synthetic resin material are suitably placed in position opposite the pressure apparatus 1, e.g., by means of said support or pedestal 3 and said pins 5, and an injection head 8 is secured on said flange 9.

Fixing said injection head on said flange is readily carried out in the way as described hereinbefore, by rotating the coupling part 18 so as to engage the teeth 21-22-23 of said coupling part behind the teeth 12-1-3-14 of said flange 9, causing the extension part 17 of said plunger or rod 10 to penetrate in the central bore 34 of said plug 33. This situation is represented in FIG. 8.

From this Figure it also appears that the content of the cylinder is sufficient for successively moulding, e.g., six objects, in the present case dental prostheses, in six different moulds 4.

As shown in FIG. 9, when the pressure apparatus 1 is put into operation, the rod 10 moves forward and, owing to the tight fit of the sealing nut 16 as well as the plug 33 within the inner wall of the cylinder 25, pushes the latter through the axial bore 19 of the coupling part 18 into engagement with the mould 4, so as to firmly press said sealing part 31 on said cap 29 against the front wall of said mould 4, th injection channel 30-32 being held in axial alignment with the injection opening provided in said front wall.

The use of said sealing part 31 ensures effective sealing of the junction between the passages thus aligned so as to prevent the synthetic resin material from escaping sideways.

The situation shown in FIG. 10 is that which arises after two moulds have been filled with synthetic resin material.

After the mould 4 has been filled with synthetic resin material the rod 10 is drawn back, the cylinder 25 being compelled to follow this backward movement by friction between the part 16 and the inner wall of said cylinder 25, so as to withdraw said sealing washer 31 from said mould 4, the latter thus being liberated for removal and replacement by the following mould. During this backward movement the plug 33 remains in the position it had reached at the end of the forward-going stroke, so as to keep said synthetic resin material under pressure during the backward stroke of the filling cylinder.

This arrangement permits filling several moulds, six in this example, in rapid succession, within a time sufficiently short to prevent the synthetic resin material from hardening whereby said material would lose its usefulness.

When the cylinder 25 is empty while more moulds remain to be filled, the rod 10 is drawn back into its backmost position; by means of the coupling part 18 the injection head 8 is completely removed to receive a new previously prepared cylinder 25 with cover 29, whereafter said coupling part with said new cylinder is again fixed on said flange 9 in the way as hereinbefore described.

Thus said coupling device permits easy mounting and dismounting of the injection head by a very simple manual operation, while also serving as a guiding means for guiding the axial movement of the filling cylinder 25.

This arrangement also permits ready replacement of cylinders 25, whereas the sealing device 31 ensures complete seaing of the injection opening of the mould while the injection head 8 itself ensures that during the injection operation, said mould is tightly held upon said support 3.

This arrangement also permits several filling cylinders to be prepared by filling them with synthetic resin, the plug 33 serving as a bottom for said cylinders, as both the cover 29 and the plug 33 are removable, the cleaning of such cylinders is quite simple, the more so as effective partial cleaning can already be achieved, in case a certain quantity of synthetic resin material should be left in the cylinder 25, by moving said plunger 10 throughout said cylinder into its forward end position, so as to remove all residual synthetic resin material from said cylinder 25.

Finally owing to the use of the twofold sealing 16 and 33, preferably ensured by menas of material such as nylon which has the possibility of dilating under the pressure as will be exerted by the rod 10 on the synthetic resin material, completely effective sealing will be achieved so as to avoid any reflux of the synthetic resin, the plug 33 being always kept in contact with said material even during the backward movement of said rod 10, it is very important that pressure should always be maintained on said synthetic resin material, in order to avoid air entry and thr formation of air bubbles in the prosthesis. In fact, if during the backward movement of the rod 10 a separation were permitted to occur between said plug 33 and said synthetic resin material, air would be drawn in through the passages 30–32.

Figure 11:
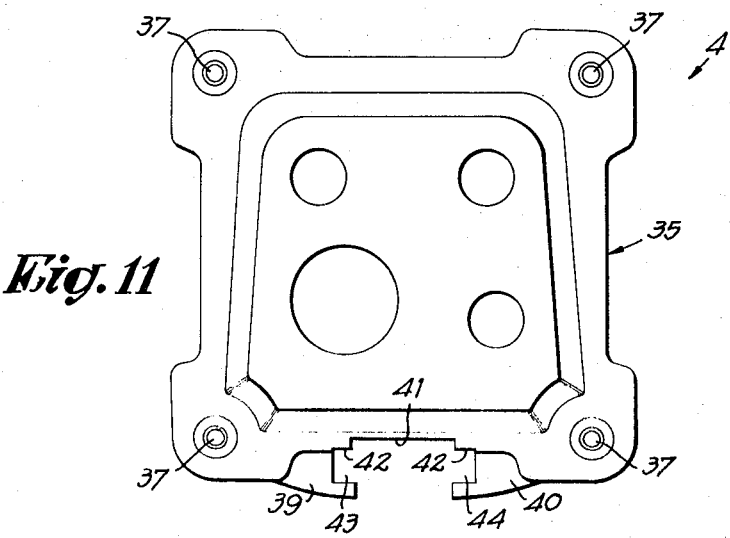
FIG. 11 is a diagrammatic plan view of an injection mould arranged as according to the invention.
Figure 12:
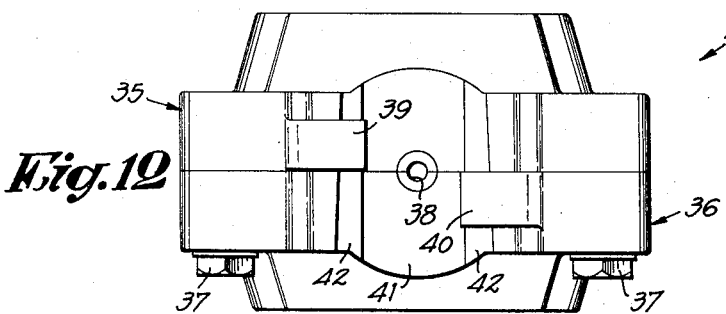
FIG. 12 is a view as seen in the direction as indicated by arrow F2 in FIG. 1.

FIG. 11 shows an injection mould 4 of a type known in itself, said moulding comprising, as usual, two parts 35 and 36 secured to each other by suitable means such as screw-bolts 37.

In a way also known in itself, said injection mould 4 is provided with an injection opening 38 preferably having its axis coincident with the junction plane between the two halves 35 and 36 of the mould.

Through this opening 38 the synthetic resin material used for moulding the dental prosthesis is to be injected under pressure.

After the mould has been filled the injection head of the injection moulding machine must be withdrawn from said opening 38, and evidently at that time said opening 38 must be sealed in order to prevent the synthetic resin material from flowing back, and to maintain the pressure in the synthetic resin material throughout the polymerization thereof.

To this effect, as shown in the accompanying drawings, braces or clamps 39 and 40 have been provided on either side of the injection opening, one on each mould half 25-36, in diagonal opposition with respect to each other; L-shaped braces 39 and 40 are used in the embodiment shown and the face 41 in which said injection opening 38 is provided is somewhat recessed with respect to the plane 42 that faces each of said braces 39 and 40. Thus U-shaped spaces 43 and 44 are formed between each of said braces 39 and 40, respectively, and the corresponding parts of the plane 42.

Figure 13:
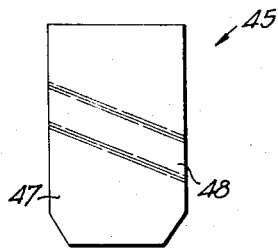
FIG. 13 shows a closing part according to the invention in front view.
Figure 14:
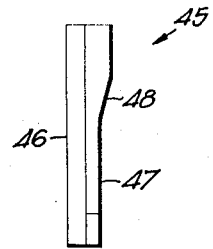
FIGS. 14 and 15 show the closing part of FIG. 3 as seen in the direction of the arrows F4 and F5 respectively.
Figure 15:
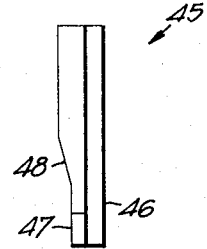

The closing part proper is in this case constituted by a slab 45 having on one side a projecting part extending throughout the length thereof, so as to provide a roughly T-shaped appearance in cross-section, said slab having a lower part 47 of reduced thickness, the transition between said lower part 47 and the thicker upper part of said slab being formed by a sloping strip-shaped surface 48, said surface having a slanting position with respect to the edges of said slab, as illustrated in FIG. 13.

The slanting position of the beveled surface 48 with respect to the edges of the slab corresponds with the diagonally opposed positions of said braces 39 and 40, as will appear hereinafter.

After the injection operation has been terminated, in order to seal said injection opening 38 it will be sufficient to simply lower said slab 45 between said braces 39 and 40 and the corresponding faces 42 of the injection mould 4, with the projection 46 directed towards the opening 38. In this way said part 46 will be applied against the surface 41, when the slab 45 is inserted to a sufficient depth, i.e., when the beveled surface 48 comes into contact with both the braces 39 and 40, said beveled surface will cause said projection 46 to be firmly pressed against the surface 41 so as to provide efficient sealing of said injection opening 38 without any special tool being required.

When after the polymerization of the synthetic resin material the mould 4 is opened, said sealing part or slab 45 can be simply removed by lifting it out of the space enclosed by said braces 39 and 40.

Preferably the slab 45 will be made of polished metal so as to effectively prevent adhesion of synthetic resin material; as removal of the slab is effected by a movement perpendicular to the injection opening 38, damage to the dental prosthesis will be avoided under all circumstances. Removal of the slab is effected by inverse movement with respect to the insertion thereof and can also be effected without any special tools. In fact, a light blow with any object at hand will be sufficient to disengage the slab from the braces 39 and 40.

Thus a very simple and efficient closing device for sealing the injection opening of moulds is obtained.

Evidently the embodiment described above has been given only as an example; within the scope of the invention many modifications can be made; thus said braces could be provided on either side of both halves 35 and 36 of the mould, in which case the beveled surface of the slab 45 would be horizontal instead of oblique; the braces 39 and 40 could have beveled inner edges in which case the slab 45 would be shaped correspondingly, etc.

It is also possible to provide both braces 39 and 40, according to the invention, either on part 35 or on part 36 of the mould.

Finally it may be observed, that in the embodiment illustrated said braces 39 and 40 are arranged for vertical insertion and removal, respectively, of the slab 45. It is of course equally possible to arrange said braces 39 and 40 for horizontal or oblique insertion and removal of said slab.

The invention is not in any way limited to the embodiment described hereinbefore as an example and illustrated in the accompanying drawings, but within the scope of the invention and the appended claims, such injection heads could be realized in many different shapes and relative dimensions.

What I claim is:

1. In an injection moulding machine having an injection head and a mould adapted to receive injection material from said injection head, wherein said injection head comprises a pressure rod, a sealing member connected to an outer end of said pressure rod, an extension part connected to said sealing member and extending beyond said sealing member, a removable filling cylinder having an outer end with an opening directed to said mould, and a plug located in said cylinder adjacent an inner end thereof and having a blind bore, said extension part fitting into said bore and inside said cylinder when said inner end is attached to said moulding machine.

2. A machine in accordance with claim 1, wherein said mould comprises a casing having an injection opening, braces located on opposite sides of said opening, a cover fitting between said braces and adapted to claose said opening and means pressing said cover against said opening.

3. A machine in accordance with claim 2, wherein said braces extend diagonally relatively to each other.

* * * * *